United States Patent [19]

Simmons et al.

[11] Patent Number: 4,896,405
[45] Date of Patent: Jan. 30, 1990

[54] TENTER CLIP

[75] Inventors: Robert S. Simmons, Warwick, R.I.; James P. Unger, Mansfield, Mass.

[73] Assignee: Marshall and Williams Company, Greenville, S.C.

[21] Appl. No.: 220,402

[22] Filed: Jul. 18, 1988

Related U.S. Application Data

[63] Continuation of Ser. No. 147,120, Jan. 21, 1988, abandoned, which is a continuation of Ser. No. 25,658, Mar. 13, 1987, abandoned.

[51] Int. Cl.$^4$ .............................................. D06C 3/04
[52] U.S. Cl. ...................................................... 26/93
[58] Field of Search .................... 26/72, 73, 93, 94, 79

[56] References Cited

U.S. PATENT DOCUMENTS

| | | | |
|---|---|---|---|
| 3,153,812 | 10/1964 | Sakakibara et al. | 26/73 |
| 3,199,165 | 8/1965 | Hyatt | 26/93 |
| 3,234,621 | 2/1966 | Hyatt | 26/93 |
| 3,494,527 | 2/1970 | Bauer et al. | 26/93 X |
| 3,551,546 | 12/1970 | Gosper et al. | 26/72 |
| 4,155,148 | 5/1979 | Richter | 26/94 |

FOREIGN PATENT DOCUMENTS

| | | | |
|---|---|---|---|
| 1923737 | 11/1970 | Fed. Rep. of Germany | 26/93 |
| 2825210 | 12/1979 | Fed. Rep. of Germany | 26/73 |
| 20549 | of 1912 | United Kingdom | 26/79 |

Primary Examiner—Werner H. Schroeder
Attorney, Agent, or Firm—Bailey & Hardaway

[57] ABSTRACT

A tenter clip is illustrated having a compressible shoe having a convex lower surface horizontally disposed for presenting a maximum flat gripping area especially useful in manufacturing plastic film and the like.

1 Claim, 1 Drawing Sheet

TENTER CLIP

This application is a continuation of application Ser. No. 147,120, filed Jan. 21, 1988, now abandoned, which application is a continuation of application Ser. No. 07/025,658, filed Mar. 13, 1987, also abandoned.

BACKGROUND OF THE INVENTION

In the manufacture of thin web or sheet material such as film which may be conventionally heated and stretched or otherwise heat treated utilizing tenter clips to maintain the sheet material in open width, it is necessary to exert a substantial gripping or clamping force to sufficiently secure the sheet material at its edges. Many efforts have been made to provide tenter clips having gripping shoes capable of exerting a clamping pressure over a wide area. When tentering film, the exertion of concentrated gripping action may result in penetration and tearing of the film material. An effort to reduce the possibility of surface penetration is illustrated in U.S. Pat. No. 2,708,784 wherein a vertical blade is covered at a lower edge with silicone which due to its resilient quality exerts a yielding action. Other patents illustrating a variety of tenter gripping elements include U.S. Pat. Nos. 2,232,536, 3,000,073, 3,514,823, 3,789,468 and 4,155,148.

Accordingly, it is an important object of this invention to provide a device which will present a maximum clamping surface area to minimize the clamping pressure which must be exerted by the movable jaw of a tenter clip to hold the edge of the sheet material.

Another important object of this invention is the avoidance of surface penetration resulting from stress concentration especially in thin material so that a maximum clamping force can be obtained over a wide area of the material.

SUMMARY OF THE INVENTION

It has been found that a longitudinal gripping member may be attached to a movable tenter clip jaw utilizing a rigid horizontal plate and a shoe constructed of a thickened layer of deformable rubbery material extending longitudinally of and being attached to the plate. A transverse convex arcuate gripping surface in the thickened layer of the deformable rubbery material clamps the edge of the sheet material against the base member affording a flat gripping surface area in engagement with the edge of the sheet material to exert a gripping force across an extended flat area of the shoe.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
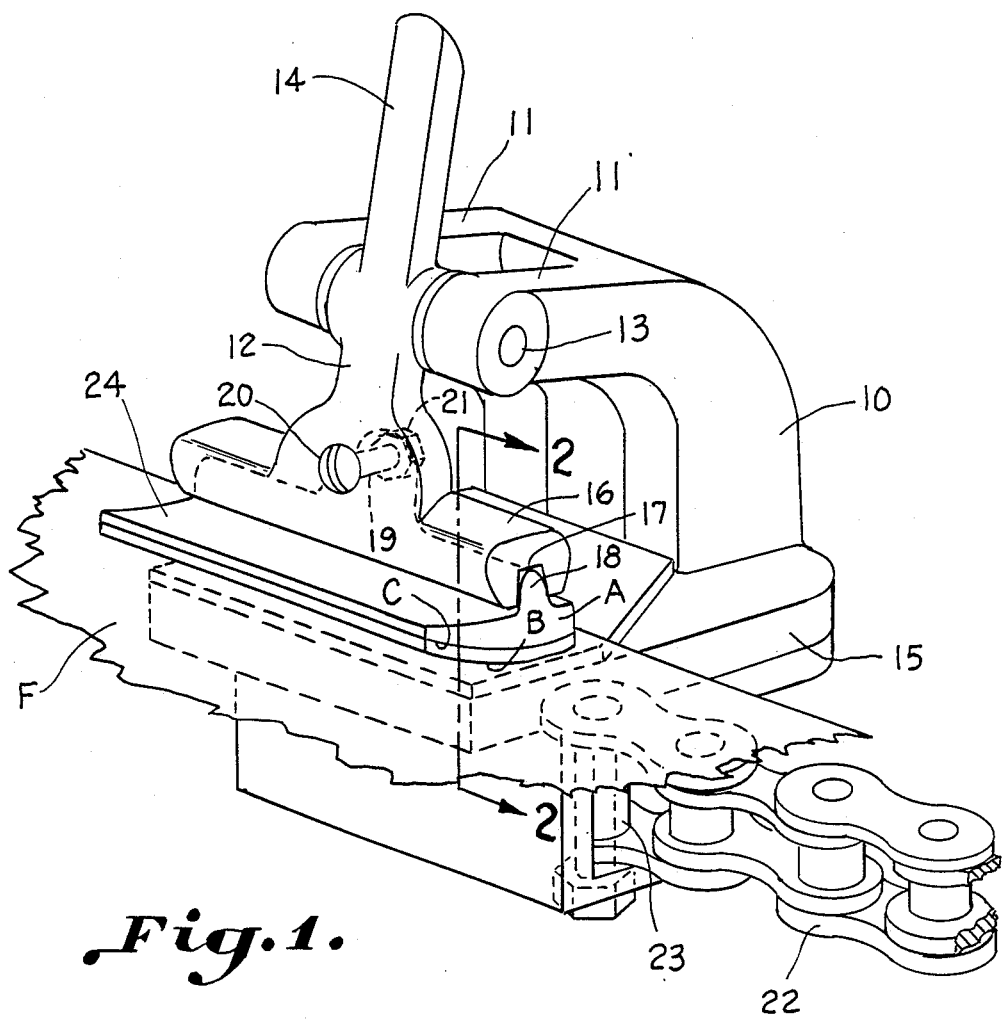
FIG. 1 is a perspective view illustrating a tenter clip having a longitudinal gripping member constructed in accordance with the invention.

The drawing illustrates a tenter clip having a movable jaw carrying a longitudinal gripping member opposite a horizontal base member for clamping an edge of sheet material being carried in open width. The longitudinal gripping member includes a rigid horizontal plate A extending longitudinally along a lower portion of the jaw opposite the base member, and means are provided for securing the plate to the jaw. A shoe constructed of a thickened layer of deformable rubbery material extends longitudinally of and is attached to the plate. A transverse convex partially cylindrical gripping surface B in the thickened layer of deformable rubbery material clamps the edge of sheet material against the base member. The gripping surface is deformable and of sufficient thickness to present a flat gripping surface area in engagement with the edge of sheet material against the base member confining the sheet material between the base and the gripping surface to exert a gripping force across an extended flat area of the shoe. The rigid horizontal plate has a convex lower surface C extending transversely thereacross, and an upper surface of the thickened layer of deformable rubbery material is bonded thereto. Convex lower surface C, and therefore, unengaged gripping surface B are semicylindrical; that is, convex lower surface C, and gripping surface B are portions of large cylinders. The dimensions of these large cylinders are much greater than the clip size. Therefore, the flat gripping surface area in engagement with the edge of sheet material is uniform regardless of the thickness of the sheet material because lower surface C presents an identical curved surface to every thickness of sheet material. The greatest possible thickness of sheet material securable by the clip is, of course, defined by the dimensions of the clip.

The tenter clip is illustrated as having an upstanding body 10 with a pair of forwardly extending arms 11 between which a movable jaw 12 is hinged as upon the pin 13. The usual arm 14 is cam operated for opening and closing the jaw in a customary fashion. A base member 15 extends forwardly beneath the movable jaw. The movable jaw is provided with a longitudinal member 16 having a U-shaped slot 17 for securing the gripping member to the pivoted jaw. The rigid horizontal plate A is provided with means for securing the plate to the jaw including an upright bracket member 18 receivable within the slot 17 with a snug fit. The bracket portion 18 has a centrally disposed upright projection 19 through which passes a fastening member illustrated as a bolt 20 having a nut 21.

Figure 2:
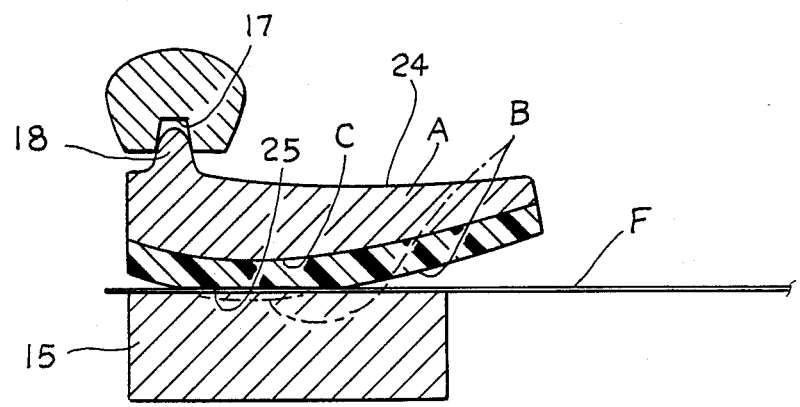
FIG. 2 is an enlarged transverse sectional elevation taken on the line 2—2 in FIG. 1.

The usual tenter chain 22 is illustrated as being secured to the base as by a pintle 23. A sheet material such as film is illustrated at F and the edge of a sheet thereof is illustrated as being gripped or clamped between a shoe having a lower surface B and the base 15. The rigid plate A is illustrated as being substantially horizontal having a forwardly extending upper surface 24 and a partially cylindrical convex lower surface C to which the thickened layer of deformable rubbery material is bonded as by any suitable glue (not shown). The shoe follows generally the contour of the lower surface of the rigid plate and has a partially cylindrical convex surface extending transversely in order to present a large flat gripping area 25. The profile of the lower surface of the shoe is illustrated in broken lines while the flat gripping area is illustrated in FIG. 2 and designed at 25. Because the lower surface of the rigid plate is partially cylindrical, that is, extension of the curve of that surface would yield a cylinder, of obviously greater dimension than the clip size and because the unengaged shoe follows the contour of that surface, the flat gripping area 25 is uniform regardless of the thickness of the sheet material so long as the thickness of that material does not exceed the range of the clip size.

By utilizing the ductility of the rubber surface, a maximum clamping area (A) is obtained utilizing a clamping force (F). This increase in clamped area causes a reduction in clamping pressure (P).

$$(P)=(F)/(A)$$

The reduction in clamping pressure minimizes the possibility of surface penetration. By eliminating surface penetration, stress is distributed over the cross section of the material rather than concentrating it at specific points. In thin materials, this concentration of stress could lead to tearing at the stress points. Thus, by providing a metal radius profile to back up the rubber, the resultant clamping force puts the rubber coating in compression rather than shear and allows the device to exert a maximum clamping force on a wide range of material thicknesses. It has been found that area may be maximized by providing plate A with a lower surface which is a part of a large cylinder. Such a partially cylindrical lower surface allows a maximum surface gripping area to be obtained with a minimum force thus significantly decreasing the required clamping pressure.

While a preferred embodiment of the invention has been described using specific terms, such description is for illustrative purposes only, and it is to be understood that changes and variations may be made without departing from the spirit or scope of the following claims.

What we claim is:

1. In a tenter clip having a movable jaw carrying a longitudinal gripping member opposite a horizontal base member for clamping an edge of sheet material of any thickness within a range defined by clip size, said sheet material being carried in open width, said longitudinal gripping member comprising:

a rigid horizontal plate having a partially cylindrical convex lower surface extending longitudinally along a lower portion of said jaw opposite said base member;

said partially cylindrical convex lower surface being a portion of a cylinder of greater dimension than said clip size;

means securing said plate to said jaw;

a shoe constructed of a thickened layer of deformable rubbery material extending longitudinally and being attached to said partially cylindrical convex lower surface of said plate;

a partially cylindrical convex gripping surface in said thickened layer of deformable rubbery material clamping said edge of sheet material against said base member; and said gripping surface being dformable and of sufficient thickness so that when the thickened layer is attached to the partially cylindrical convex lower surface portion of said rigid horizontal plate a large flat gripping surface area of compressed rubbery material is in engagement with said edge of sheet material against said base member confining the sheet material between the base member and the gripping surface to exert a gripping force across an extended flat area of said shoe;

said partially cylindrical convex lower surface of said rigid plate presenting an identical curved surface to every thickness of sheet material within the range of the clip size and thereby presenting a uniform flat gripping surface area to every thickness of sheet material within the range of the clip size;

whereby said large flat gripping-surface decreases required clamping pressure.

* * * * *